United States Patent
Cao et al.

(10) Patent No.: US 10,733,163 B2
(45) Date of Patent: Aug. 4, 2020

(54) RECORD INSERTION BY GENERATING UNIQUE INDEX BASES

(71) Applicant: INTERNATIONAL BUSINESS MACHINES CORPORATION, Armonk, NY (US)

(72) Inventors: Mei Zhen Cao, Beijing (CN); Min Fang, Beijing (CN); Di Jin, Beijing (CN); Zhen Yu Shi, Beijing (CN); Nigel G. Slinger, Los Gatos, CA (US); Shu Wang, Beijing (CN); Li Fei Zheng, Shanghai (CN); Wen Jie Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 306 days.

(21) Appl. No.: 15/704,349

(22) Filed: Sep. 14, 2017

(65) Prior Publication Data
US 2019/0079960 A1    Mar. 14, 2019

(51) Int. Cl.
*G06F 16/22* (2019.01)
*G06F 16/2457* (2019.01)
*G06F 16/23* (2019.01)

(52) U.S. Cl.
CPC ...... *G06F 16/2228* (2019.01); *G06F 16/2315* (2019.01); *G06F 16/24575* (2019.01)

(58) Field of Classification Search
CPC ........... G06F 16/2228; G06F 16/24575; G06F 16/2315
See application file for complete search history.

(56) References Cited

U.S. PATENT DOCUMENTS

| | | | |
|---|---|---|---|
| 9,208,186 B2 | 12/2015 | Molini | |
| 9,665,662 B1* | 5/2017 | Gautam | G06F 16/903 |
| 2007/0208703 A1* | 9/2007 | Shi | G06F 16/951 |
| 2010/0114976 A1* | 5/2010 | Castellanos | G06F 16/22 |
| | | | 707/803 |
| 2011/0246479 A1 | 10/2011 | Chen et al. | |
| 2013/0268484 A1* | 10/2013 | Sasaki | G06F 16/2246 |
| | | | 707/609 |
| 2016/0055185 A1* | 2/2016 | Goel | G06F 17/277 |
| | | | 707/744 |
| 2016/0124864 A1* | 5/2016 | Sun | G06F 16/9014 |
| | | | 711/216 |
| 2016/0171039 A1* | 6/2016 | Eisenreich | G06F 16/2365 |
| | | | 707/698 |

(Continued)

OTHER PUBLICATIONS

Merriam-Webster, Inc., represent (verb), 2020, Merriam-Webster. com, p. 2—definition 11, <https://www.merriam-webster.com/dictionary/represent> (Year: 2020).*

*Primary Examiner* — James Trujillo
*Assistant Examiner* — Michal Bogacki
(74) *Attorney, Agent, or Firm* — Kenneth Han (57) ABSTRACT

Embodiments of the present invention disclose a method, computer program product, and system for inserting one or more records into a database table. An insert request for inserting a new record to a database table is received, wherein the new record includes at least one key field. a partial identity of at least one record matching the at least one key field of the new record is searched for. A partial identity is assigned to the new record based on a result of the searching.

18 Claims, 5 Drawing Sheets

(56) References Cited

U.S. PATENT DOCUMENTS

| | | |
|---|---|---|
| 2016/0306835 A1 | 10/2016 | Li et al. |
| 2017/0091249 A1* | 3/2017 | St-Denis ............. G06F 16/2282 |
| 2017/0308621 A1* | 10/2017 | Wu ..................... G06F 16/9024 |
| 2017/0344588 A1* | 11/2017 | Horowitz ............ G06F 16/2228 |
| 2019/0026301 A1* | 1/2019 | Wang ................... G06F 16/152 |

* cited by examiner

| ACCOUNT_NUM (201) | DESTINATION (202) | GLOBAL ID (203) | |
|---|---|---|---|
| 12345 | BEIJING | 1 | — 210 |
| 12345 | SHANGHAI | 2 | — 220 |
| 12346 | WUHAN | 3 | — 230 |
| 12345 | BEIJING | 4 | — 240 |
| 12348 | BEIJING | 5 | — 250 |
| 12349 | SHANGHAI | 6 | — 260 |
| 12350 | SHANGHAI | 7 | — 270 |

| | 501 | | 502 | | 503 | |
|---|---|---|---|---|---|---|
| | ACCOUNT_NUM | | DESTINATION | | PARTIAL ID | |
| | 12345 | | BEIJING | | 1 | — 510 |
| | 12345 | | SHANGHAI | | 1 | — 520 |
| | 12346 | | WUHAN | | 1 | — 530 |
| | 12345 | | BEIJING | | 2 | — 540 |
| | 12348 | | BEIJING | | 1 | — 550 |
| | 12349 | | SHANGHAI | | 1 | — 560 |
| | 12350 | | SHANGHAI | | 1 | — 570 |

RECORD INSERTION BY GENERATING UNIQUE INDEX BASES

BACKGROUND

The present invention relates generally to the field of technology, and more particularly to the insertion of one or more records into a database table.

A database system, such as a Database Management System (DBMS) allows collection, organization, searching and processing of information in a variety of manners. Typically, data in the database system are stored in tables comprising columns defining fields of information for a record, and rows containing specific records of those fields of the database. Conventionally, an identity (ID) column is used to achieve unique key values in records of a database table. Values of the ID column can be generated in a variety of ways, for instance, by a user-developed application, the DBMS (for example, IBM® DB2® Universal Database), or other similar applications, to achieve uniqueness of the records.

However, in a high concurrency system, performance bottlenecks may exist. A performance bottleneck may be that all the concurrent INSERT threads on the same database table need to be serialized in order to obtain different values of the ID column. As such, contention between threads on serialization resources would be caused, for example, latch/lock in DB2® (DB2 and all DB2-related trademarks and logos are trademarks or registered trademarks of International Business Machines Corporation and/or its affiliates). As a result, the performance of the system may be reduced.

SUMMARY

Embodiments of the present invention disclose a method, computer program product, and system for inserting one or more records into a database table. An insert request for inserting a new record into a database table is received, wherein the new record includes at least one key field. A partial identity of at least one record matching the at least one key field of the new record is searched for. A partial identity is assigned to the new record based on a result of the searching.

DETAILED DESCRIPTION

Embodiments of the present invention relate to the field of computing, and more particularly to record insertion into database tables. The following described exemplary embodiments provide a system, method, and program product to, among other things, provide ID columns based on partial IDs of matching records in order to allow non-serialized all concurrent INSERT threads. Therefore, the present embodiment has the capacity to improve the technical field of database storage by increasing the efficiency of table record insertion. System performance may also increase using the partial ID assignments to new records based on partial IDs of the matching records.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or obj ect code written in any combination of one or more programming languages, including an object oriented programming language such as Smalltalk® (Smalltalk and all Smalltalk-related trademarks and logos are trademarks or registered trademarks of ParcPlace Systems and/or its affiliates), C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
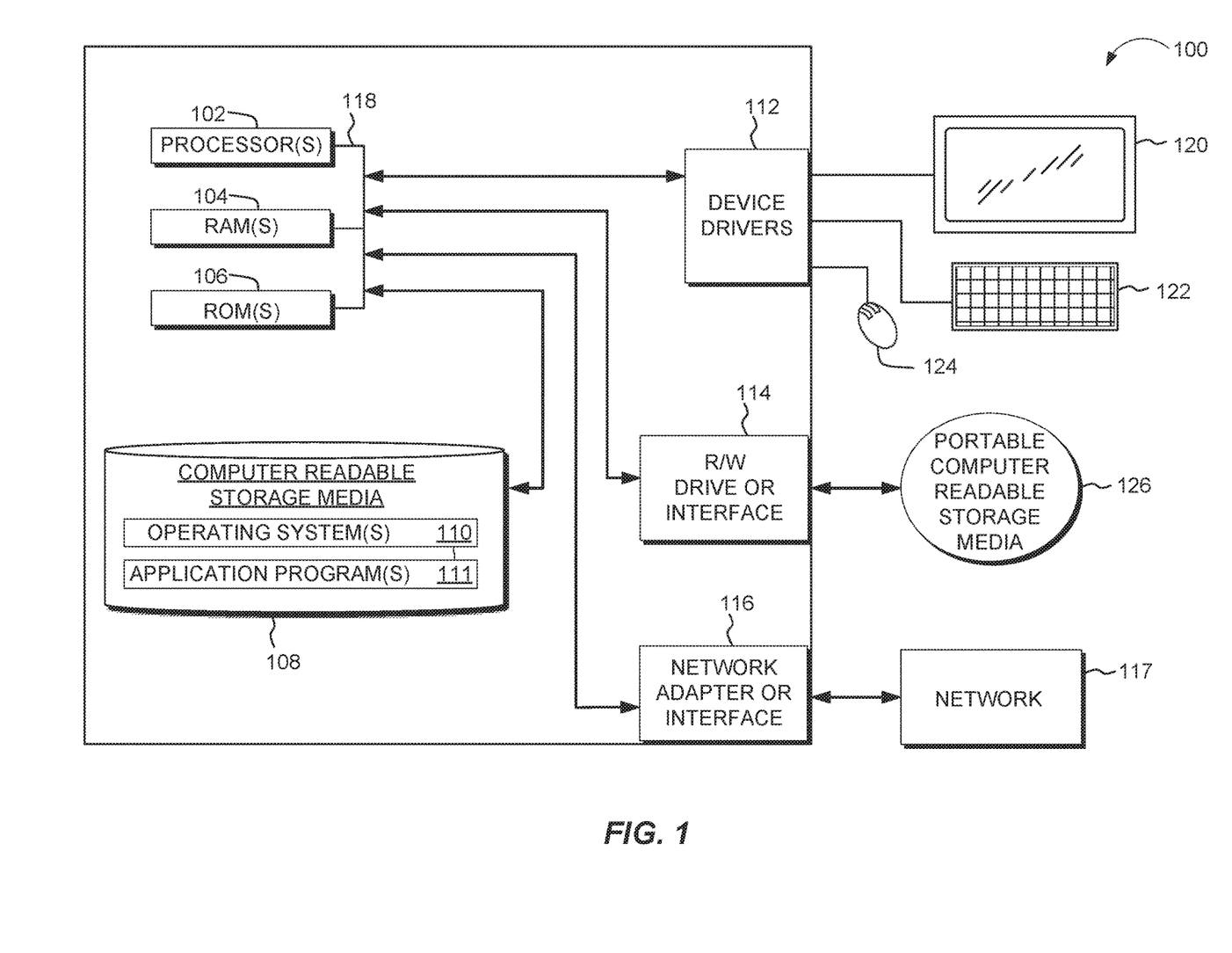
FIG. 1 is a block diagram of the components of an exemplary computing device, in accordance with an embodiments of the present invention.

The present invention will now be described in detail with reference to the Figures. FIG. 1 depicts a block diagram of components of an exemplary computing device, computing device 100, in accordance with an embodiment of the present invention. It should be appreciated that FIG. 1 provides only an illustration of one implementation and does not imply any limitations with regard to the environments in which different embodiments may be implemented. Many modifications to the depicted environment may be made.

Computing device 100 may include one or more processors 102, one or more computer-readable RAMs 104, one or more computer-readable ROMs 106, one or more computer readable storage media 108, device drivers 112, read/write drive or interface 114, network adapter or interface 116, all interconnected over a communications fabric 118. Communications fabric 118 may be implemented with any architecture designed for passing data and/or control information between processors (such as microprocessors, communications and network processors, etc.), system memory, peripheral devices, and any other hardware components within a system.

One or more operating systems 110, and one or more application programs 111, are stored on one or more of the computer readable storage media 108 for execution by one or more of the processors 102 via one or more of the respective RAMs 104 (which typically include cache memory). In the illustrated embodiment, each of the computer readable storage media 108 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 100 may also include a R/W drive or interface 114 to read from and write to one or more portable computer readable storage media 126. Application programs 111 on computing device 100 may be stored on one or more of the portable computer readable storage media 126, read via the respective R/W drive or interface 114 and loaded into the respective computer readable storage media 108.

Computing device 100 may also include a network adapter or interface 116, such as a TCP/IP adapter card or wireless communication adapter (such as a 4G wireless communication adapter using OFDMA technology) for connection to a network 128. Application programs 111 on computing device 100 may be downloaded to the computing device from an external computer or external storage device via a network (for example, the Internet, a local area network or other wide area network or wireless network) and network adapter or interface 116. From the network adapter or interface 116, the programs may be loaded onto computer readable storage media 108. The network may comprise copper wires, optical fibers, wireless transmission, routers, firewalls, switches, gateway computers and/or edge servers.

Computing device 100 may also include a display screen 120, a keyboard or keypad 122, and a computer mouse or touchpad 124. Device drivers 112 interface to display screen 120 for imaging, to keyboard or keypad 122, to computer mouse or touchpad 124, and/or to display screen 120 for pressure sensing of alphanumeric character entry and user selections. The device drivers 112, R/W drive or interface 114 and network adapter or interface 116 may comprise hardware and software (stored on computer readable storage media 108 and/or ROM 106).

Figure 2:
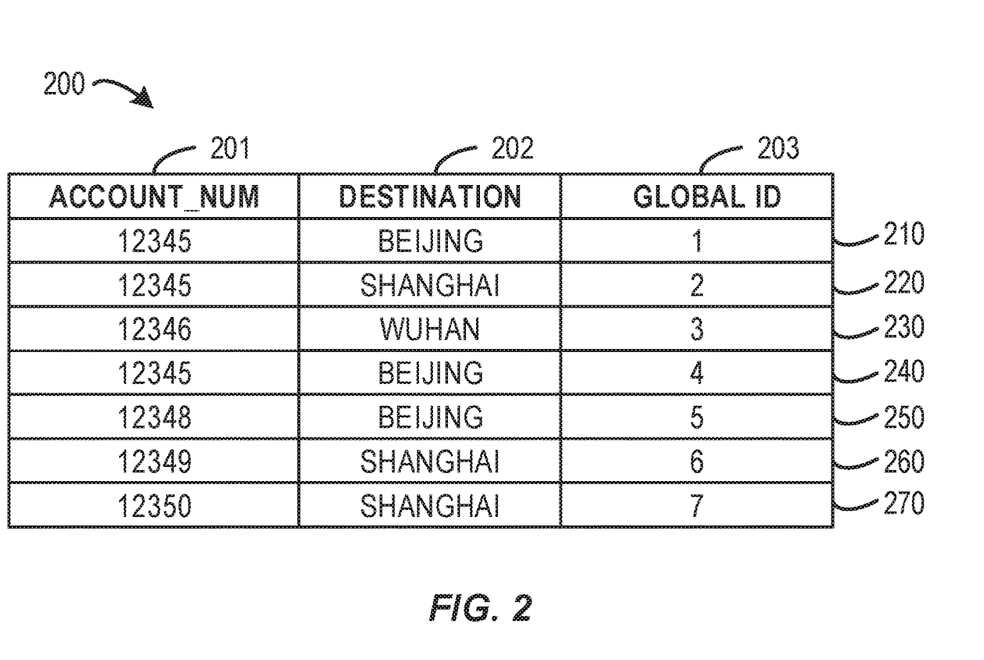
FIG. 2 is a schematic diagram of a database table, in accordance with the prior art.

With reference now to FIG. 2, a schematic diagram of a database table 200 using a conventional global ID is described. In the example of FIG. 2, the database table 200 is illustrated as a travel application data table commonly used to record travel logs. It should be appreciated by those in the art that the example of the database table 200 is just discussed for illustration, rather than limitation. Those skilled in the art would readily appreciate that the database table 200 can be any other suitable tables or have any other suitable forms.

Conventionally, the uniqueness of records 210 to 270 in the database table 200 is achieved by adding the Global ID column into unique index keys (also referred to as "key columns" hereafter). More specifically, when inserting a new record to the database table 200, a new global ID that is different from any of the existing values in the Global ID column is assigned to the new record. Thus, the new record can be differentiated from those records already stored in the database table 200.

In the example of FIG. 2, there are 3 columns in the database table 200, namely, columns "Account Number" 201, "Destination" 202, and "Global ID" 203. The column "Global ID" 203 is the conventional ID column for achieving uniqueness of the records 210 to 270. As shown in FIG. 2, values in the column "Global ID" 203 are different on respective records 210 to 270 of the database table 200, so as to achieve uniqueness in the database table level. Conventionally, the maximum value of the Global ID may be stored in a control block. When a new record is to be inserted, the maximum Global ID may be obtained, for example from the control block, for generating a new Global ID for the new record.

However, for a high concurrency system, if there are a large number of INSERT threads on the database table 200, for example, if there is a large amount of data to be written to the database table 200, the large number of INSERT threads need to be serialized to achieve the uniqueness. This is time consuming and possibly results in contention between the threads on serialization resources. As such, the performance of the system is reduced.

To address this and other potential problem, embodiments of the present disclosure provide a solution by designing in a database table a new type of ID column, also referred to as "partial ID" column hereafter. Specifically, an insert request may be received for inserting to a database table a new record including at least one key field. Partial ID(s) of record(s) matching the at least one key field of the new record are searched for. A partial ID may be assigned to the new record based on the partial ID(s) of the matching record(s). By including such partial ID column, when a number of concurrent INSERT threads occur that may reduce performance, it may not be necessary to serialize all these concurrent INSERT threads, but only serialize on some qualified INSERT threads. In this way, contentions on serialization resources may be reduced, thereby improving the system performance.

Figure 3:
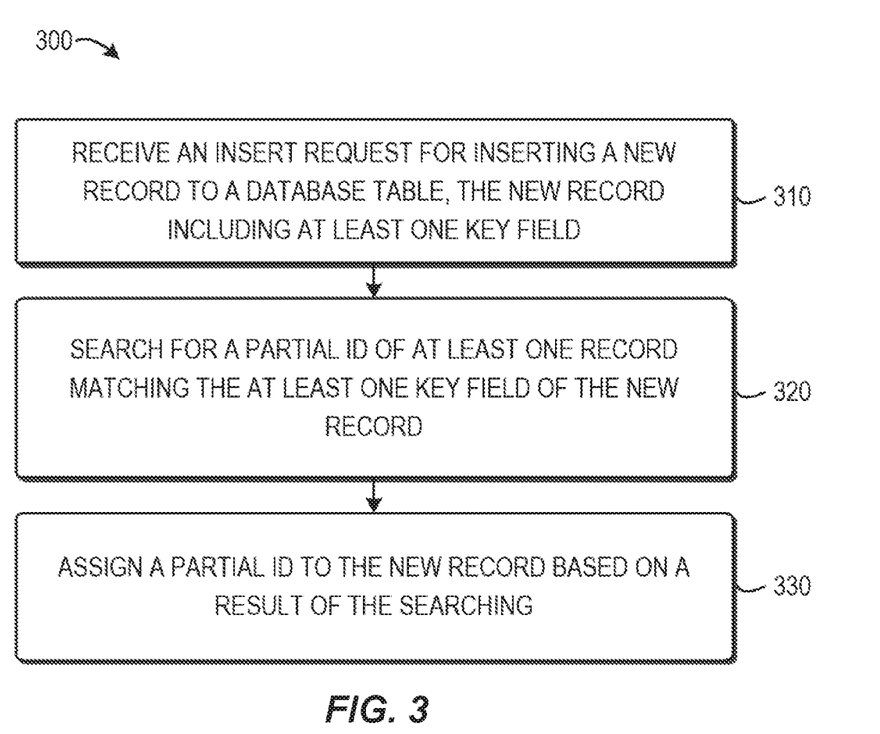
FIG. 3 shows a flow chart depicting the operational steps for generating a partial ID, in accordance with embodiments of the present disclosure.

Now more details of embodiments of the present disclosure will be discussed with reference to FIGS. 3 to 7. With reference to FIG. 3, FIG. 3 is a flow chart of a method 300 for generating a partial ID in accordance with embodiments of the present disclosure. The method 300 may be at least in part implemented by the device as discussed with respect to FIG. 1, for example, a controller, a server, a DBMS, a user-developed application, or other suitable device(s).

An insert request for inserting a new record to a database table is received (block 310). The new record includes at least one key field. A key field may be a value in a key column of the database table. In embodiments of the present disclosure, the key column is used in achieving uniqueness of a record in a database table. The database table may include a plurality of columns, wherein one or several columns may be the key columns. The key column(s) may be predefined according to system requirements, user preference, and/or the like, either independently or dependently in different database tables.

Figure 5:
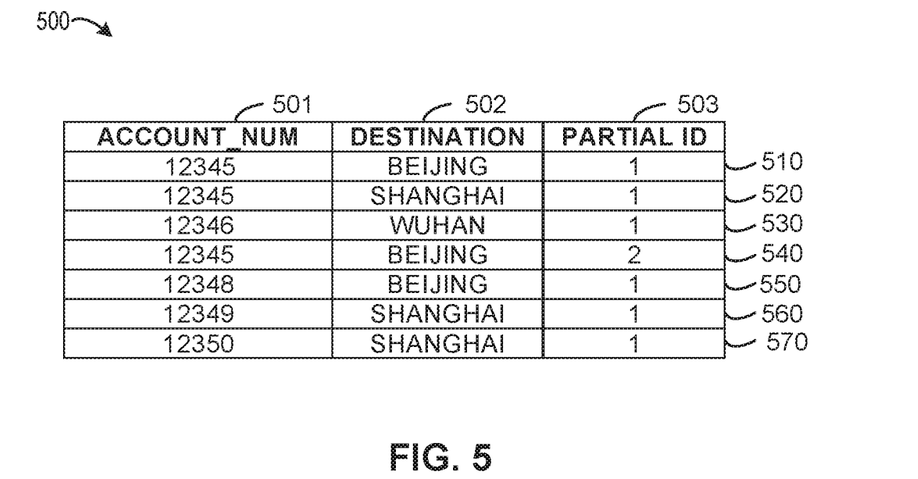
FIG. 5 is a schematic diagram of a database table using the partial ID in accordance with embodiments of the present disclosure.

For purpose of illustration, the database table in embodiments of the present disclosure will be discussed with reference to the database table 500 shown in FIG. 5. The database table 500 includes three columns "Account Number" 501, "Destination" 502, and "Partial ID" 503, and contains a plurality of records 510-570 of travel application journal data. The fields of each of the records 510-570 include an account number (for example, 12345, 12346, 12348, 12349 and 12350), a destination (such as BEIJING, SHANGHAI, and WUHAN), and a partial ID (for example, 1, 2, and so on).

It is to be understood that the database table 500 is merely described for the purpose of providing an example, rather than suggesting any limitation. Those skilled in the art would appreciate that the database table applicable to embodiments of the present disclosure can have different numbers and/or types of columns and records and may have any suitable forms. For example, the database table 500 may further include one or more other suitable columns that may be or may not be the key columns. In the example of the database table 500, all of the columns "Account Number" 501, "Destination" 502, and "Partial ID" 503 are predefined as the key columns.

Still referring to embodiments of FIG. 3, when a function for inserting data to a database table is invoked, it may be determined that an insert request is received. In an embodiment, the database table may be first created as follows:

```
CREATE TABLE test_db (
Account_Num INT,
Destination CHAR(255),
ID        INT as IDENTITY START WITH 1 INCREMENT BY 1,
NAME      CHAR(16),
AGE       INT).
```

The insert request may be received when the following function is invoked:
CREATE UNIQUE INDEX ON test_tb (Account_Num, Destination, ID).

In an example, the data to be inserted may include one or more fields, such as an account number and a destination, and is also referred to as a "new record" in embodiments of the present disclosure. As to the database table 500, if "(12345, BEIJING)" needs to be inserted, the new record may be "(12345, BEIJING)," wherein "12345" is the account number (corresponding to "Account_Num" in the above function) and corresponds to a field of the new record, and "BEIJING" is the destination and corresponds to another field of the new record. In this example, since columns 501 and 502 are both key columns, it may be determined that "12345" and "BEIJING" are both key fields. Thus, when the new record is inserted to the database table 500, these key fields would become values of the key columns 501 and 502, respectively. More specifically, "12345" would be a value of the key column 501, and "BEIJING" would be a value of the key column 502.

It is to be understood that the above new record is just an example, rather than suggesting any limitation. Those skilled in the art would appreciate that the new record may include one or more fields other than the key fields, for example "NAME" and "AGE."

A partial ID of at least one record matching the key field(s) of the new record is searched for (block 320). The partial ID may be used in combination with the value(s) of key column(s) to achieve uniqueness of a record. In some embodiments, the partial IDs are different for records having same value(s) of key column(s). In some embodiments, if any of the records of the database table has the same key field(s) as the new record, it can be determined as a matching record. Thus, the partial ID(s) of the matching record(s) may be found.

In an embodiment, the partial ID(s) of the matching record(s) may be searched for in the database table. Referring to the example shown in FIG. 5, the database table 500 includes 7 records 510-570. By searching the database table 500, it may be found that the records 510 and 540 have the same key fields (that is, account number "12345" and destination "BEIJING") as the new record. Thus, the records 510 and 540 may be determined as the matching records. Accordingly, the partial IDs of the records 510 and 540 may be found as "1" and "2", respectively. Then, the maximum partial ID of the matching records is determined as 2.

It is to be understood that the above example is discussed for illustration, rather than limitation. In alternative embodiments, the partial ID(s) of the matching record (s) may be searched for in an index associated with the database table. The index may include information about record(s) in the database table, for example, but not limited to, values of key columns of the table and the partial ID(s). The index may be arranged in a descendant order of partial IDs of the records, as shown in FIG. 7 discussed below.

Figure 7:
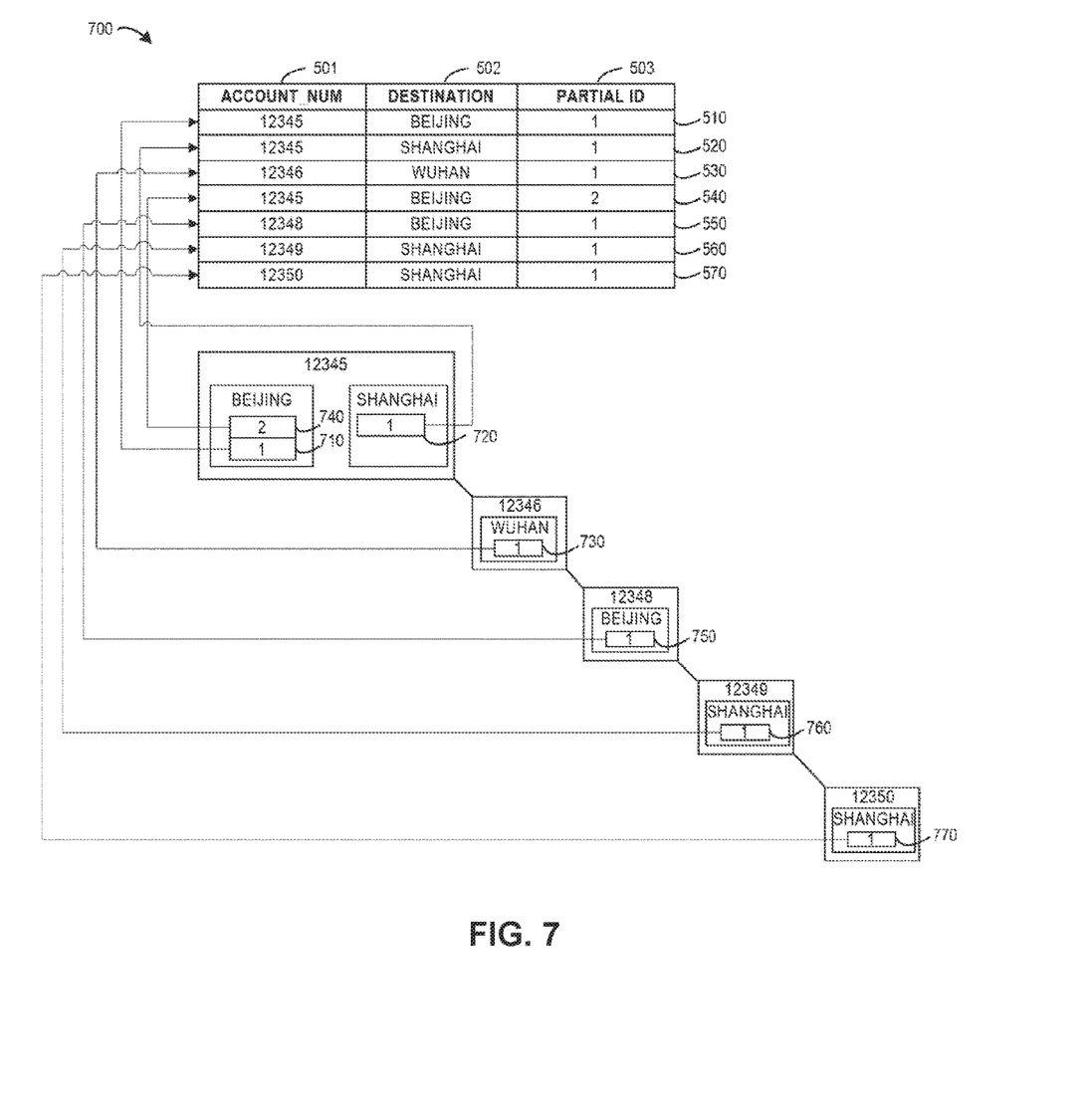
FIG. 7 is a schematic diagram of an index 700 associated with the database table 500 in accordance with embodiments of the present disclosure.

FIG. 7 is a schematic diagram of an index 700 associated with the database table 500 in accordance with embodiments of the present disclosure. In the example of FIG. 7, the index 700 is implemented in the form of a tree (also referred to as an index tree hereafter). As shown in the index tree, there are 7 nodes 710 to 770 associated with the records 510 to 570, respectively. For instance, each node in the index tree has a pointer to the associated record in the database table.

The nodes in the index 700 are arranged in a descendant order of partial IDs of the records. For example, the node 740 having the partial ID "2" is located before the node 710 having the partial ID "1". In these embodiments, when a new record (12345, BEIJING) is to be inserted to the database table 500, the partial ID(s) of the matching record(s) may be searched for based on the index 700 at Step 320. In this example, by searching the index, it may be determined that nodes 710 and 740 associated with the records 510 and 540 that match the key fields of the new record. Thus, the partial IDs of the matching records 510 and 540 can be found as "1" and "2". In an alternative embodiment, it is possible to only obtain the partial ID associated with the first matching node as the maximum partial ID directly, for example "2", due to the descendant order of the partial IDs.

It is to be understood that above embodiment is just an example rather limitation. It would be appreciated that the partial ID(s) of the matching record(s) may be searched for in an index arranged in an ascendant order of partial IDs of the records. In such case, the node 710 may be located before the node 740, and the partial IDs of the matching records can be also found as "1" and "2".

Alternatively or in addition, in some embodiments, it is possible that no partial ID can be found at Step 320. Thus, the result of the searching at block 320 may indicate whether there are matching record(s), the number of the matching record(s), partial ID(s) of the matching record(s) and/or the like.

A partial ID is assigned to the new record based on a result of the searching (block 330) In some embodiments, if no partial ID is found, for example, no matching node or record is found in the index or in the database table, the partial ID of the new record may be determined as an initial value. The initial value may be predefined according to system requirements, user preference, default settings, and/or the like. In an embodiment, the initial value may be 0, 1, or other suitable predefined value. The new record may be inserted into any suitable position of the database table, for example, as the first record of the database table, the last record of the database table, and so on.

Alternatively or in addition, in some embodiments, if partial ID of one or more matching records are found, the partial ID of the new record may be determined based thereon. The determination of the partial ID may be implemented in a variety of ways. For example, the partial ID of the new record may be determined based on a maximum partial ID among the partial IDs of the matching records.

Figure 4:
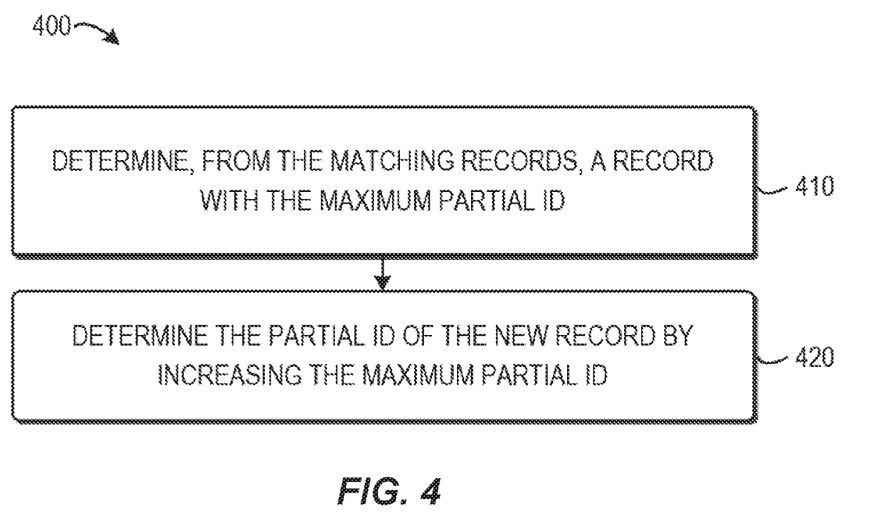
FIG. 4 shows a flow chart depicting the operational steps for determining the partial ID for a new record, in accordance with embodiments of the present disclosure.

FIG. 4 shows a flow chart of a method 400 for determining the partial ID for a new record in accordance with embodiments of the present disclosure. It is to be understood that the method 400 is an implementation of block 330, which is discussed for purpose of illustration, rather than suggesting any limitation.

A record with the maximum partial ID is determined from the matching records (block 410). In some embodiments, when a new record is inserted to the database table, a partial ID is assigned to the new record by increasing a current maximum partial ID. Still referring to the example shown in FIG. 5, the most recently inserted record may be determined from the matching records 510 and 540, for example, based on the time sequence of insertion of the records. In this example, it is assumed that the most recently inserted record is record 540. Then, the partial ID of the matching record 540 may be acquired as the maximum partial ID. In this example, the maximum partial ID of matching record(s) is "2". Afterwards, the maximum partial ID may be increased, for example by 1. As such, the partial ID of the new record can be determined as "3". In this way, the partial ID of the new record can be determined in a fast and accurate way, without introducing extra CPU overhead.

The partial ID of the new record is determined by increasing the maximum partial ID (block 420). For example, if the maximum partial ID of the matching record is 1, the partial ID assigned to the new record may be a value larger than 1, for example, 2. In this way, the most recently inserted record could always have the maximum partial ID.

Figure 6:
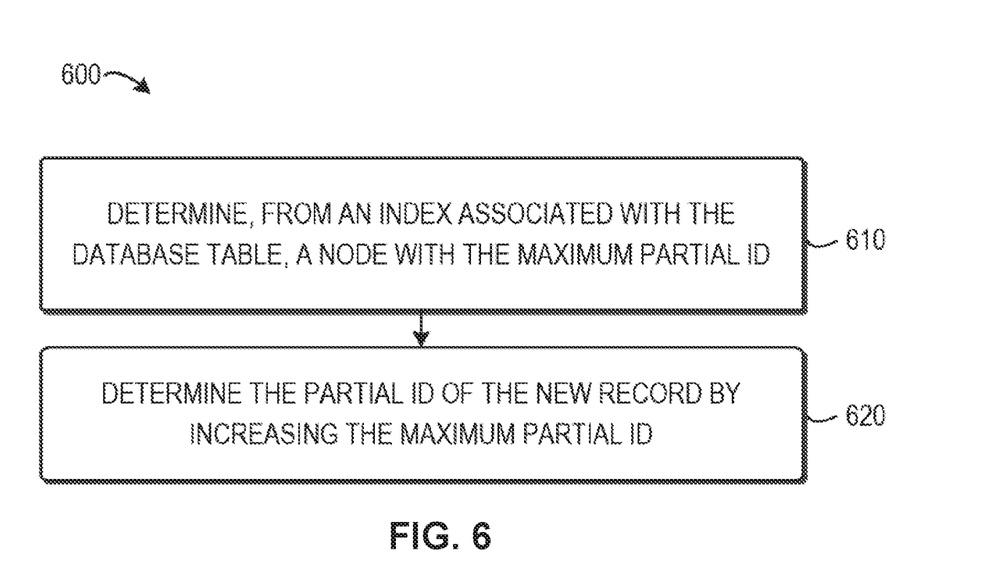
FIG. 6 shows a flow chart depicting the operational steps for determining the partial ID for a new record in accordance with further embodiments of the present disclosure.

FIG. 6 shows a flow chart of a method 600 for determining the partial ID for a new record in accordance with further embodiments of the present disclosure. It is to be understood that the method 600 is an implementation of block 330, which is discussed for the purpose of providing an illustration, rather than suggesting any limitation.

A node with the maximum partial ID is determined from an index associated with the database table (block 610). The index, also referred to as "database index", is a data structure that improves the speed of data retrieval operations on a database table at the cost of additional writes and storage space to maintain the index data structure. Indexes are used to quickly locate data without having to search every row in a database table every time. The index may be created using one or more columns of a database table, providing the basis for both rapid random lookups and efficient access of ordered records. By comparing key field(s) of the new record with the information included in the node(s) of the index, it is possible to find the node(s) with information matching the key fields of the new record. Such node(s) are also referred to as "node(s) associated with the matching records" or "matching node(s)". A matching node may indicate a node of the index which is associated with a matching record in the database table.

FIG. 7 is a schematic diagram of an index 700 associated with the database table 500 in accordance with embodiments of the present disclosure. In the example of FIG. 7, the index 700 is implemented in the form of a tree (also referred to as an index tree hereafter). As shown in the index tree, there are 7 nodes 710 to 770 associated with the records 510 to 570, respectively. For instance, each node in the index tree has a pointer to the associated record in the database table.

In some embodiments, the nodes in the index tree are arranged in a descendant order of partial IDs of the records. For example, the node 740 having the partial ID "2" is located before the node 710 having the partial ID "1". In these embodiments, when a new record (12345, BEIJING) is to be inserted to the database table 500, the key fields of the new record may be compared with the information of the nodes in the index. In this case, the node 740 may be determined as the matching node with the maximum partial ID, because it is located in the first place.

Referring back to FIG. 6, the partial ID of the new record may be determined by increasing the maximum partial ID (block 620). For example, the maximum partial ID may be increased, for example, as "3", and assign the partial ID "3" to the new record.

It is to be understood that the above example is illustrated for discussion, rather than limitation. Those skilled in the art would appreciate that the nodes in the index tree are not necessary to be arranged in a descendant order of partial IDs of the records, but can be arranged in any suitable order, for example, an ascending order. In some embodiments, when a new record (12345, BEIJING) is to be inserted to the database table 500, by going through the index tree, the nodes 710 and 740 associated with the matching records 510 and 520 may be found. Since the node 740 has a partial ID "2" larger than the partial ID "1" of the node 710, the partial ID "2" may be determined as the maximum partial ID. Then, the maximum partial ID may be increased, for example, as "3", and assign the partial ID "3" to the new record.

In addition to the above, in some embodiments, the new record may be inserted to the database table with its partial ID. In an embodiment, the index associated with the database table may be updated based on the new record and the partial ID. Still referring to the example of FIG. 7, the index 700 may be updated by inserting a new node (not shown) for example, denoted with the partial ID "3", before the first node 740. As such, the index can be arranged in a descendant order of partial IDs.

It is to be understood that the above example is just described for illustration, rather than limitation. Those skilled in the art would appreciate that in some embodiments, when there are a plurality of new records to be inserted to the database table, they may be inserted either in series or in parallel. For example, when a plurality of new records are to be inserted into the database table, the new records having different key fields may be inserted in parallel. Comparing with the conventional solution using the global ID, the parallel insertion can increase the processing speed and efficiency effectively.

In view of the embodiments of the present disclosure, several advantages can be achieved, for example, but not limited to, easy implementation, no extra overhead, reduced contention, and so on. More specifically, when the index is arranged with the descendant order of the values of the partial column, it is easy to find the maximum number of the partial ID since the first one we found would be the highest one. When traversing the index tree, the device only needs to get a latch, thus the time duration is very short. Furthermore, for every INSERT operation, embodiments of the present disclosure do not introduce any extra overhead. Still further, uniqueness of the partial ID is maintained only when prior key columns have the same value. In this way, the possibility of contention on serialization resources is reduced.

It is to be understood that the above examples are described merely for the purpose of illustration, without suggesting any limitation as to the scope of the disclosure. Those skilled in the art will appreciate that there are many other suitable way for assigning the partial ID to the new record.

The methods 300, 400 and 600 may be implemented by computer programs. For example, the computer programs, when executed by a processor on a device (such as the computer system 12 shown in FIG. 1, or one or more cloud computing nodes (not shown), may be loaded into the memory and cause the device to implement the method 300 or 400.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A method for inserting one or more records into a database table, the method comprises:
  receiving an insert request for inserting a new record to the database table, the new record including at least one key field, wherein the key field is selected from a value in a key column of the database table, wherein the key column represents a uniqueness of the new record in the database table, wherein the key column is selected from one or more columns in the database table based on a user preference;
  searching for a partial identity of at least one record matching the at least one key field of the new record, wherein searching for the partial identity comprises searching in an index associated with the database table for the partial identity of a first matching node matching the at least one key field of the new record, wherein the index is arranged in a descendant order of the partial identities of records in the database table, wherein the node with the maximum partial identity is located before other nodes, wherein the first matching node is associated with the record matching the at least one key field of the new record, wherein the partial identity associated with the first matching node is assigned the maximum partial identity-; and
  assigning the partial identity to the new record based on a result of the searching.

2. The method of claim 1, wherein assigning the partial identity to the new record further comprises:
  in response to no partial identity being found, determining the partial identity of the new record as an initial value.

3. The method of claim 1, wherein assigning the partial identity to the new record further comprises:
  in response to one or more of the partial identities of matching records being found, determining the partial identity of the new record based on a maximum partial identity among the partial identities of the matching records.

4. The method of claim 3, wherein determining the partial identity of the new record based on the maximum partial identity further comprises:
  acquiring the maximum partial identity among partial identities of the matching records; and
  determining the partial identity of the new record by increasing the maximum partial identity.

5. The method of claim 4, wherein acquiring the maximum partial identity further comprises:
  determining, from the matching records, a record most recently inserted into the database table; and
  determining the partial identity of the determined record as the maximum partial identity.

6. The method of claim 1, further comprises:
  inserting the new record into the database table with the partial identity.

7. The method of claim 6, further comprises:
  updating an index associated with the database table based on the new record and the partial identity.

8. A computer system for inserting one or more records into a database table, the computer system comprises:
  one or more computer processors;
  one or more computer-readable storage media;
  program instructions stored on the computer-readable storage media for execution by at least one of the one or more processors, the program instructions comprising:
    instructions to receive an insert request for inserting a new record to a database table, the new record including at least one key field, wherein the key field is selected from a value in a key column of the database table, wherein the key column represents a uniqueness of the new record in the database table, wherein the key column is selected from one or more columns in the database table based on a user preference;
    instructions to search for a partial identity of at least one record matching the at least one key field of the new record, wherein searching for the partial identity comprises searching in an index associated with the database table for the partial identity of a first matching node matching the at least one key field of the new record, wherein the index is arranged in a descendant order of the partial identities of records in the database table, wherein the node with the maximum partial identity is located before other nodes, wherein the first matching node is associated with the record matching the at least one key field of the new record, wherein the partial identity associated with the first matching node is assigned the maximum partial identity; and
    instructions to assign the partial identity to the new record based on a result of the searching.

9. The computer system of claim 8, wherein instructions to assign the partial identity to the new record further comprise:
  in response to no partial identity being found, instructions to determine the partial identity of the new record as an initial value.

10. The computer system of claim 8, wherein instructions to assign the partial identity to the new record further comprise:
  in response to the one or more partial identities of matching records being found, instructions to determine the partial identity of the new record based on a maximum partial identity among the partial identities of the matching records.

11. The computer system of claim 10, wherein instructions to determine the partial identity of the new record based on the maximum partial identity further comprise:
  instructions to acquire the maximum partial identity among partial identities of the matching records; and
  instructions to determine the partial identity of the new record by increasing the maximum partial identity.

12. The computer system of claim 11, wherein instructions to acquire the maximum partial identity further comprise:
  instructions to determine, from the matching records, a record most recently inserted into the database table; and
  instructions to determine the partial identity of the determined record as the maximum partial identity.

13. The computer system of claim 8, further comprises:
  instructions to insert the new record to the database table with the partial identity.

14. The computer system of claim 13, further comprises:
instructions to update an index associated with the database table based on the new record and the partial identity.

15. A computer program product for inserting one or more records into a database table, the computer program product comprises:
one or more computer-readable storage media and program instructions stored on the one or more computer-readable storage media, the program instructions comprising:
instructions to receive an insert request for inserting a new record to a database table, the new record including at least one key field, wherein the key field is selected from a value in a key column of the database table, wherein the key column represents a uniqueness of the new record in the database table, wherein the key column is selected from one or more columns in the database table based on a user preference;
instructions to search for a partial identity of at least one record matching the at least one key field of the new record, wherein searching for the partial identity comprises searching in an index associated with the database table for the partial identity of a first matching node matching the at least one key field of the new record, wherein the index is arranged in a descendant order of the partial identities of records in the database table, wherein the node with the maximum partial identity is located before other nodes, wherein the first matching node is associated with the record matching the at least one key field of the new record, wherein the partial identity associated with the first matching node is assigned the maximum partial identity; and
instructions to assign the partial identity to the new record based on a result of the searching.

16. The computer program product of claim 15, wherein instructions to assign the partial identity to the new record further comprise:
in response to no partial identity being found, instructions to determine the partial identity of the new record as an initial value; and
in response to the one or more partial identities of matching records being found from the database table, instructions to determine the partial identity of the new record based on a maximum partial identity among the partial identities of the matching records.

17. The computer program product of claim 16, wherein instructions to determine the partial identity of the new record based on the maximum partial identity further comprise:
instructions to acquire the maximum partial identity among partial identities of the matching records; and
instructions to determine the partial identity of the new record by increasing the maximum partial identity.

18. The computer program product of claim 15 further comprises:
instructions to insert the new record to the database table with the partial identity.

* * * * *